United States Patent

Suzuoki et al.

Patent Number: 5,943,061
Date of Patent: *Aug. 24, 1999

[54] METHOD AND APPARATUS FOR GENERATING IMAGES UTILIZING A STRING OF DRAW COMMANDS PRECEDED BY AN OFFSET DRAW COMMAND

[75] Inventors: Masakazu Suzuoki, Tokyo; Teiji Yutaka, Kanagawa; Makoto Furuhashi, Kanagawa; Masayoshi Tanaka, Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/708,883

[22] Filed: Sep. 5, 1996

Related U.S. Application Data

[63] Continuation of application No. 08/418,090, Apr. 6, 1995, abandoned.

Foreign Application Priority Data

Apr. 8, 1994 [JP] Japan .................................. 6-095717

[51] Int. Cl.⁶ .................................................. G06T 3/00
[52] U.S. Cl. .......................................... 345/438; 345/433
[58] Field of Search .................................... 345/433, 437, 345/438, 439, 427, 473, 474, 121, 126, 507, 513; 382/293–296

[56] References Cited

U.S. PATENT DOCUMENTS

| | | | |
|---|---|---|---|
| 4,991,117 | 2/1991 | Iwamura et al. | 364/521 |
| 5,295,237 | 3/1994 | Park | 395/137 |
| 5,321,810 | 6/1994 | Case et al. | 345/515 |
| 5,483,627 | 1/1996 | Silverbrook et al. | 345/433 |
| 5,596,693 | 1/1997 | Needle et al. | 345/474 |
| 5,664,162 | 9/1997 | Dye | 345/521 |

FOREIGN PATENT DOCUMENTS

| | | |
|---|---|---|
| 0 425 187 A2 | 2/1991 | European Pat. Off. |
| 0 430 501 A2 | 5/1991 | European Pat. Off. |
| 0 676 722 A2 | 11/1995 | European Pat. Off. |

OTHER PUBLICATIONS

Foley et al., *Computer Graphics: Principles and Practice*, 1990, pp. 13, 14, 201, 320, 321, 202, 386, 387, 471–473.
Young et al., *The X Window System Programming & Applications with Xt*, 1992, pp. 311, 312.
Geometrical Transformations—pp. 201–308—Foley et al.
Elementary Data Structures—Algorithms in C++—Robert Sedgewick—pp. 15–21.
Patent Abstracts of Japan—JP 63136521—vol. 12, No. 395 (E–671).
Patent Abstracts of Japan—JP 5102326—vol. 17, No. 453 (E–1417).

*Primary Examiner*—Stephen S. Hong
*Attorney, Agent, or Firm*—Hill & Simpson

[57] ABSTRACT

A method and apparatus for generating images wherein access to a main memory is minimized during a translation of an image of a 3D object or the like on a display screen to increase the speed of the translation process. A string of draw commands for drawing an image is preceded by an offset draw command which indicates offset values for the coordinates of the vertices of the image, and the image is translated on the display screen in accordance with the offset draw command. A header portion of each of the offset draw command and the draw commands that constitute the draw command string includes data indicating the address on the main memory of the next draw command to be executed. The image generation apparatus includes a frame buffer in which an image is drawn, a CPU for generating a string of draw commands to draw the image and an offset draw command indicating offset values for the coordinates of the vertices of the image, a main memory for storing the string of draw commands and offset draw command generated by the CPU, and a drawing device portion for executing the string of draw commands and offset draw command from the main memory to draw a translated image on the frame buffer.

4 Claims, 6 Drawing Sheets

FIG.3

| | | |
|---|---|---|
| Ooj | AD | |
| | OFIN | |
| | dx | dy |
| IPa | AD | |
| | INCO | |
| | Ax | Ay |
| | Bx | By |
| | Dx | Dy |
| | Cx | Cy |
| IPb | AD | |
| | INCO | |
| | Dx | Dy |
| | Cx | Cy |
| | Ex | Ey |
| | Fx | Fy |
| IPc | AD | |
| | INCO | |
| | Bx | By |
| | Cx | Cy |
| | Gx | Gy |
| | Fx | Fy |
| Ook | AD | |
| | OFIN | |
| | dx | dy |

Aoj { IPa, IPb, IPc }

FIG. 6A
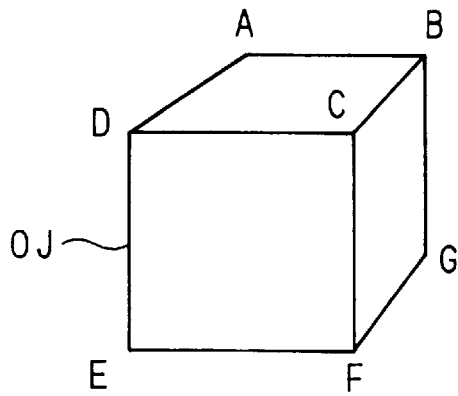
FIG. 6B
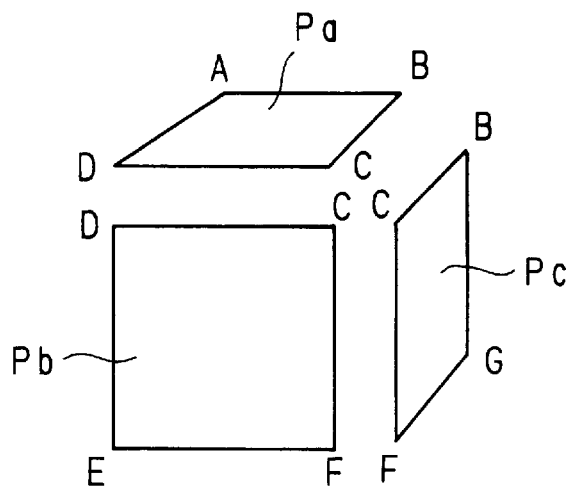
FIG. 6C
| IPa | |
|---|---|
| INCO | |
| Ax | Ay |
| Bx | By |
| Dx | Dy |
| Cx | Cy |
| IPb | |
|---|---|
| INCO | |
| Dx | Dy |
| Cx | Cy |
| Ex | Ey |
| Fx | Fy |
| IPc | |
|---|---|
| INCO | |
| Bx | By |
| Cx | Cy |
| Gx | Gy |
| Fx | Fy |
DRAWING DEVICE PORTION — 62
FRAME BUFFER — 66

FIG. 7
(PRIOR ART)

| | Fa | |
|---|---|---|
| IPa | \multicolumn{2}{c}{INCO} |
| | Ax | Ay |
| | Bx | By |
| | Dx | Dy |
| | Cx | Cy |
| IPb | \multicolumn{2}{c}{INCO} |
| | Dx | Dy |
| | Cx | Cy |
| | Ex | Ey |
| | Fx | Fy |
| IPc | \multicolumn{2}{c}{INCO} |
| | Bx | By |
| | Cx | Cy |
| | Gx | Gy |
| | Fx | Fy |

⟹

| | Fb | |
|---|---|---|
| IPa | \multicolumn{2}{c}{INCO} |
| | Ax+dx | Ay+dy |
| | Bx+dx | By+dy |
| | Dx+dx | Dy+dy |
| | Cx+dx | Cy+dy |
| IPb | \multicolumn{2}{c}{INCO} |
| | Dx+dx | Dy+dy |
| | Cx+dx | Cy+dy |
| | Ex+dx | Ey+dy |
| | Fx+dx | Fy+dy |
| IPc | \multicolumn{2}{c}{INCO} |
| | Bx+dx | By+dy |
| | Cx+dx | Cy+dy |
| | Gx+dx | Gy+dy |
| | Fx+dx | Fy+dy |

METHOD AND APPARATUS FOR GENERATING IMAGES UTILIZING A STRING OF DRAW COMMANDS PRECEDED BY AN OFFSET DRAW COMMAND

This is a continuation of application Ser. No. 08/418,090, filed Apr. 6, 1995, now abandoned.

BACKGROUND OF THE INVENTION

1. Field of the Invention

The present invention relates to a method and an apparatus for generating images suitable for use with apparatuses utilizing computer graphics such as video game machines and graphic computers which must perform a high level of visualization using limited hardware resources.

2. Description of the Related Art

In video game machines and graphic computers, a drawing device portion is provided between the CPU and frame buffer (frame memory) in order to improve the processing speed. During the generation of an image, the CPU does not directly access the frame buffer, but generates commands to draw basic figures such as triangles and quadrangles and sends them to the drawing device portion. The drawing device portion interprets those commands from the CPU and draws the figures on the frame buffer.

The smallest unit a figure processed by the drawing device portion is referred to as a polygon or primitive and a command to draw it is referred to as a draw command or display list.

In a 3D (three-dimensional) graphics system in which an object is drawn on a two-dimensional display screen with a three-dimensional appearance, the surface of the 3D object to be rendered is divided into a plurality of polygons, and the polygons are sequentially drawn on a frame buffer to reconstruct an image having a three-dimensional appearance.

For example, when a 3D object OJ as shown at FIG. 6A is drawn, as shown at FIG. 6B, the surface of the object OJ is divided into a polygon Pa with vertices A, B, D, and C, a polygon Pb with vertices D, C, E, and F, and a polygon Pc with vertices B, C, G, and F. Then, as shown at FIG. 6C, draw commands IPa, IPb, and IPc associated with the polygons Pa, Pb, and Pc, respectively, are sequentially transferred to a drawing device portion 62 to sequentially draw the polygons Pa, Pb, and Pc on a frame buffer 66.

In the draw commands IPa, IPb, and IPc, the coordinates of the vertices of the respective polygons Pa, Pb, and Pc are added to respective indication codes INCO indicating that the subsequent data are polygon draw commands.

In applications such as video game machines, scenes frequently appear where 3D objects as described above are displayed by simply translating them. In such a case, the coordinates of the vertices of all of the polygons that form the object have been rewritten on a frame-by-frame basis.

Specifically, assume that the object OJ as shown at FIG. 6A is translated on the display screen in X and Y directions by amounts dx and dy, respectively. In the main memory, as shown in FIG. 7, the coordinate values of each of the vertices in the draw commands IPa, IPb, and IPc associated respectively with the polygons Pa, Pb, and Pc which constitute the object OJ are greater respectively by dx and dy in the frame Fb after the translation than in the frame Fa before the translation.

The applicant has made the following Japanese patent applications which are related to the drawing device according to this application.

05-190763 (filed on Jun. 30, 1993) corresponding to U.S. application Ser. No. 269,076, filed Jun. 30, 1994.

05-190764 (filed on Jul. 2, 1993) corresponding to U.S. application Ser. No. 267,678, filed Jun. 29, 1994.

05-258625 (filed on Oct. 15, 1993) corresponding to U.S. application Ser. No. 320,272, filed Oct. 11, 1994.

06-027405 (filed on Jan. 31, 1994) corresponding to U.S. application Ser. No. 369,745, filed Jan. 27, 1995.

Each of the above applications is owned by the assignee of the present invention.

When an object is translated on a display screen by rewriting the coordinates of the vertices of all of the polygons that constitute the object on a frame-by-frame basis as described above, the main memory must be frequently accessed, and this results in a problem in that the translation process can not be performed at high speed.

SUMMARY OF THE INVENTION

It is an object of the present invention to minimize access to a main memory during a translation of an image of a 3D object or the like on a display screen to increase the speed of the translation process.

According to the present invention, a string of draw commands for drawing an image is preceded by an offset draw command which indicates offset values for the coordinates of the vertices of the image, and the image is translated on the display screen in accordance with the offset draw command.

A header portion of each of the above-described offset draw command and the draw commands that constitute the draw command string includes data indicating the address on the main memory of the next draw command to be executed. Further, the image is a three-dimensional object formed by a plurality of polygons.

An image generation apparatus according to the present invention includes a frame buffer 66 in which an image is drawn, a CPU 11 for generating a string of draw commands to draw the image and an offset draw command indicating offset values for the coordinates of the vertices of the image, a main memory 21 in which the string of draw commands and offset draw command generated by the CPU 11 are stored, and a drawing device portion 62 for executing the string of draw commands and offset draw command supplied from the main memory 21 to draw a translated image on the frame buffer 66.

According to the method and apparatus for generating images of the present invention employing the above-described configuration, when an image of a 3D object or the like is translated on a display screen, it is necessary only to rewrite the offset values for the coordinates of the vertices in the offset draw command that precedes the string of draw commands. This minimizes access to the main memory and makes it possible to perform the translation process at high speed.

In addition, since the main memory is accessed according to the address data in the header portion of Each of the offset draw command and the draw commands that constitute the string, the offset draw command and the draw commands constituting the string can be obtained in a linked form in the order in which they are to be executed.

As a result, it is not necessary to place the offset draw command and the draw commands that constitute the string in consecutive memory areas of the main memory in the order of execution. Even when a need for a translation arises on the method of the execution, it is not required to change the positions of the subsequent draw commands in the main memory, and the order of the execution of the offset draw command and the draw commands that constitute the draw command string can be easily changed by rewriting the address data in the header portions of those draw commands without changing their positions in the main memory.

As is apparent from the above, the present invention minimizes access to the main memory during a translation of an image of a 3D object or the like on a display screen to allow the translation process to be performed at high speed.

Further, even when a need for a translation arises on the method of the execution, it is not required to change the positions of the subsequent draw commands in the main memory, and the order of the execution of the draw commands can be easily changed by rewriting the address data in the header portions of the draw commands without changing their positions in the main memory.

BRIEF DESCRIPTION OF THE DRAWINGS

FIG. 3 illustrates another example of the configuration of offset draw commands and polygon draw commands in the case of a translation of an object according to the present invention.

FIGS. 6A, 6B and 6C illustrate a method of drawing an object.

FIG. 7 illustrates an example of offset draw commands and polygon draw commands in the case of a translation of an object according to a conventional method.

DETAILED DESCRIPTION OF PREFERRED EMBODIMENT

Figure 1:
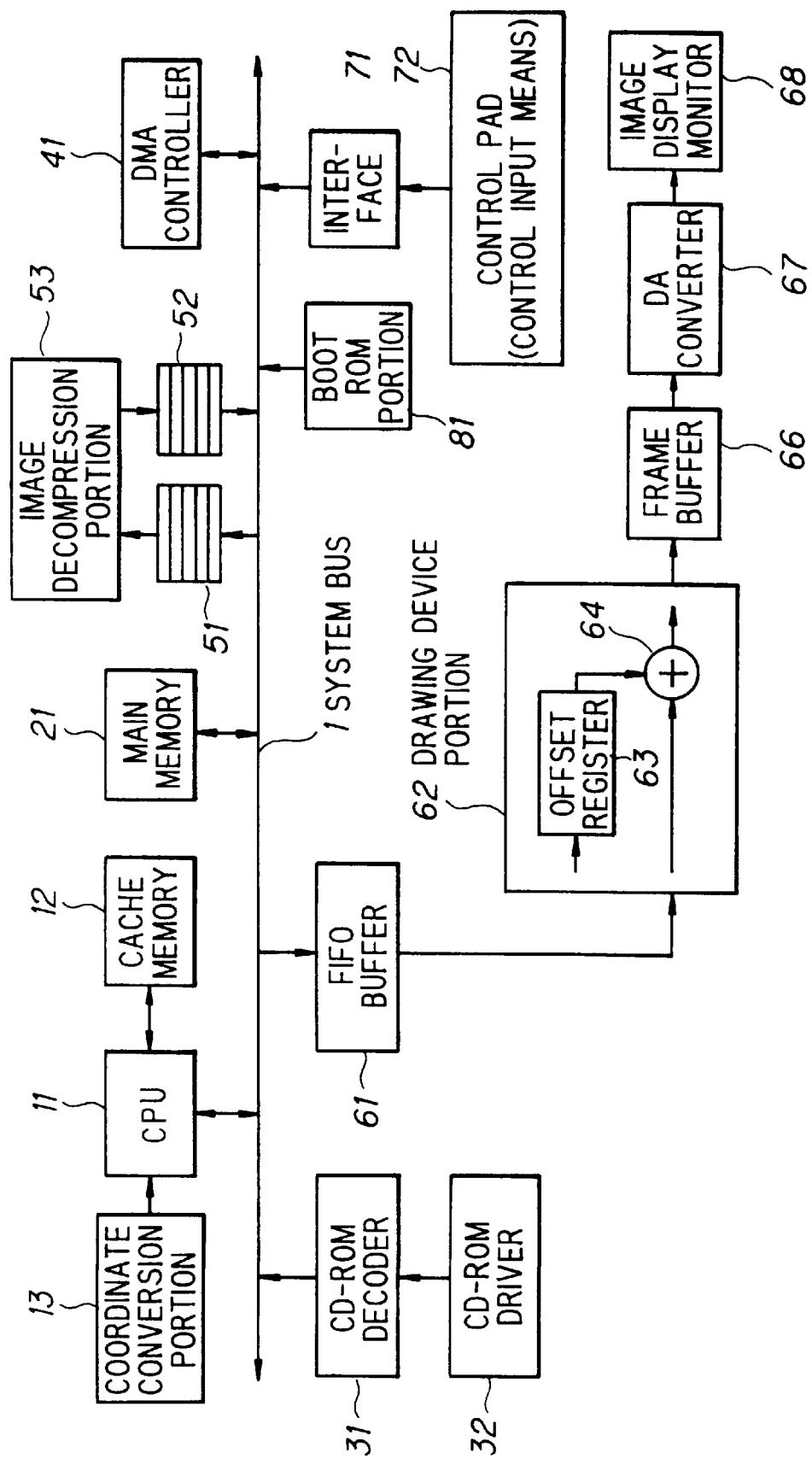
FIG. 1 is a block diagram of an image generation apparatus according to an embodiment of the present invention.

FIG. 1 shows an image generation apparatus according to an embodiment of the present invention which is configured as a video game machine.

A CPU 11 is connected to a system bus (main bus) 1. A cache memory 12 is connected to the CPU 11 which controls the system as a whole. Further, a coordinate conversion portion 13 for performing calculations for converting the coordinates of a polygon and the like is connected to the CPU 11. For example, a 32-bit CPU may be used as the CPU 11.

A main memory 21 is also connected to the system bus 1.

Further, a CD-ROM decoder 31 and a DMA (direct memory access) controller 41 are connected to the system bus 1. A CD-ROM driver 32 is connected to the CD-ROM decoder 31. A CD-ROM is loaded in the CD-ROM driver 32.

The CD-ROM contains an application program including polygon draw commands and data including image data which has been compressed using, for example, a discrete cosine transformation (DCT). The application program and data are decoded by the CD-ROM decoder 31 and are transferred to the main memory 21 by the DMA controller 41.

An image decompression portion 53 is also connected to the system bus 1 through a FIFO buffer 51 and a FIFO buffer 52 at input and output ends thereof, respectively. The image decompression portion 53 decompresses the above-described compressed image data.

A drawing device portion 62 is also connected to the system bus 1 through a FIFO buffer 61. A frame buffer 66 is connected to the drawing device portion 62. A D-A converter 67 is connected to the frame buffer 66. An image display monitor 68 is connected to the D-A converter 67.

The drawing device portion 62 executes draw commands which have been received from the main memory 21 through the DMA controller 41 to draw an image on the frame buffer 66. In the present embodiment, it includes an offset register 63 for storing offset values for the coordinates of vertices included in an offset draw command to be described later and an adder 64 for adding the offset values to the coordinates of each vertice included in each draw command that forms a part of a draw command string for drawing the image.

The frame buffer 66 is formed by a frame buffer having areas which are switched at each vertical period. Image data output by the frame buffer 66 is converted by the D-A converter 67 into an analog video signal which is output to the image display monitor 68.

A control pad 72 as a control input means for the video game machine is also connected to the system bus 1 through an interface 71. Also connected to the system bus 1 is a boot ROM 73 in which a program for starting up the video game machine is stored.

In the above-described image generation apparatus, draw commands are generated by the CPU 11 in the main memory 21; the draw commands are transferred to the drawing device portion 62 by the DMA controller 41; the drawing device portion 62 executes the draw commands to draw an image on the frame buffer 66; and the image is displayed on the image display monitor 66.

The draw commands transferred from the main memory 21 to the drawing device portion 62 include offset draw commands which precede respective strings of draw commands to draw an image.

Figure 2:
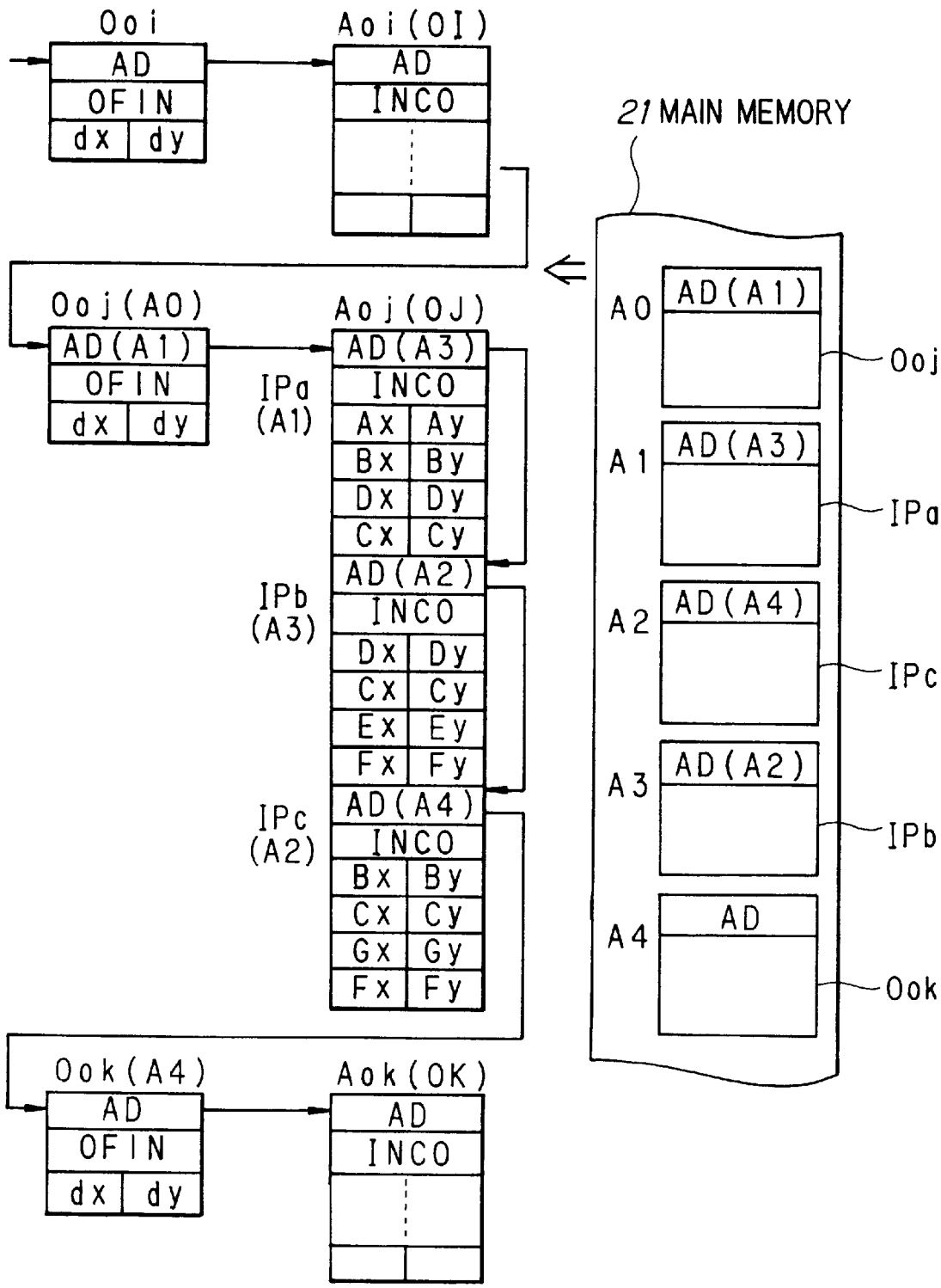
FIG. 2 illustrates an example of the configuration of offset draw commands and polygon draw commands in the case of a translation of an object according to the present invention.

Assume that, in one frame, an object OI is followed by an object OJ which is divided into polygons Pa, Pb, and Pc as shown in FIG. 6B and another object OK is subsequently drawn. Then, as shown in FIG. 2, a draw command string Aoi for the object OI is preceded by an offset draw command Ooi; a draw command string Aoj for the object OJ that follows the draw command string Aoi is preceded by an offset draw command Ooj inserted therebetween; and a draw command string Aok for the object OK that follows the draw command string Aoj is preceded by an offset draw command Ook inserted therebetween.

A header portion of each of the offset draw commands Ooi, Ooj, and Ook includes data AD that indicates the address in the main memory 21 of the next draw command to be executed. Specifically, the header portion of the offset draw command Ooj includes the address of the first draw command IPa in the draw command string Aoj for the object OJ. The header portions are followed by indication codes OFIN indicating that the subsequent data are offset draw commands which are in turn followed by offset values dx and dy for the coordinates of the vertices of the respective objects OI, OJ, and OK.

In this embodiment, the offset values dx and dy are generated by the CPU 11 in accordance with input operations using the control pad 72, stored in combination with the respective address data AD and indication codes OFIN in the main memory 21 as the offset draw commands Ooi, Ooj, and Ook, and transferred from the main memory 21 to the drawing device portion 62 by the DMA controller 41.

The draw command string Aoj for the object OJ is formed by draw commands IPa, IPb, and IPc for the divided polygons Pa, Pb, and Pc. The draw commands IPa, IPb, and IPc include data AD indicating the addresses in the main memory 21 of the next draw commands to be executed in header portions thereof. The header portions are followed by indication codes INCO indicating that the subsequent data are polygon draw commands which are in turn followed by coordinate strings for the vertices of the respective polygons Pa, Pb, and Pc.

The draw command strings Aoi and Aok for the objects OI and OK have the same configuration except that, when the object OK is the last object drawn in a frame, the last draw command to be executed in the draw command string Aok for the object OK includes an indication code indicating that it is the last draw command in the frame instead of the address data AD, although not shown.

When address data AD is inserted in the header portions of offset draw commands and polygon draw commands as described above, it is not necessary that such offset draw commands and polygon draw commands are placed in consecutive memory areas in the main memory 21 in the order in which they are to be executed.

In the example shown in FIG. 2, certain consecutive memory areas in the main memory 21 are represented by addresses A0, A1, A2, A3, and A4. In the main memory 21, the offset draw command Ooj, polygon draw command IPa, polygon draw command IPc, polygon draw command IPb, and offset draw command Ook are stored in the addresses A0, A1, A2, A3, and A4, respectively. The address data AD of the offset draw command Ooj, polygon draw command IPa, polygon draw command IPb, and polygon draw command IPc indicate addresses A1, A3, A2, and A4, respectively.

The DMA controller 41 transfers the offset draw commands and polygon draw commands from the main memory 21 to the drawing device portion 62 in an order which is in accordance with the addresses of those commands in the main memory 21 indicated by the respective address data AD. Specifically, in the example shown in FIG. 2, they are transferred as a list of draw command strings in an order such that the offset draw command Ooj is transferred first and is followed by the polygon draw command IPa, polygon draw command IPb, polygon draw command IPc, and then offset draw command Ook.

In the drawing device portion 62, the offset values dx and dy for the coordinates of vertices in the offset draw command Ooj are written in the offset register 63, and the adder 64 sequentially adds the offset values dx and dy to the coordinates of the respective vertices of the polygons Pa, Pb, and Pc in the polygon draw commands IPa, IPb, and IPc to sequentially obtain the coordinates of respective vertices for translated versions of the polygons Pa, Pb, and Pc based on which the polygons Pa, Pb, and Pc are sequentially drawn on the frame buffer 66 so that the object OJ is translated on the display in the X and Y directions by the offset values dx and dy, respectively.

In the case that the object OJ is to be further translated in the next frame in the same directions and by the same amount, the offset values dx and dy for the coordinates of vertices in the offset draw command Ooj are doubled, with the coordinates of the vertices of the polygons Pa, Pb, and Pc in the polygon draw commands IPa, IPb, and IPc kept unchanged.

As described above, when an object is translated on the display screen, it is necessary only to rewrite the offset values dx and dy for the coordinates of vertices in the relevant offset draw command. As a result, access to the memory 21 is minimized and the translation process can he performed at high speed.

By inserting the data AD indicating the address in the main memory 21 of the next draw command to be executed in the header portion of each of the offset draw commands and polygon draw commands as in the above-described example, the main memory 21 can be sequentially accessed according to the address data AD to obtain the offset draw commands and polygon draw commands in a linked form in the order of execution. Accordingly, it is not necessary that the offset draw commands and polygon draw commands are placed in consecutive memory areas on the main memory in the order of execution. Therefore, even when a need for a translation arises on the method of the execution, it is not required to change the positions of the subsequent draw commands in the main memory 21, and the order of the execution of the draw commands can be easily changed by rewriting the address data AD in the header portions of the draw commands without changing their positions in the main memory 21.

Illustratively, in the example in FIG. 2, the polygons Pa, Pb, and Pc are sequentially drawn in the order listed to draw the object OJ. If these polygons are to be sequentially drawn in an order such that the polygon Pa is drawn first and is followed by the polygon Pc and then the polygon Pb, the address data AD in the polygon draw commands IPa, IPc, and IPb are rewritten to respectively indicate the addresses A2, A3, and A4 in the main memory 21.

The above-described address data AD may be omitted as shown in FIG. 3. In this case, however, the DMA controller 41 transfers the offset draw commands and polygon draw commands from the main memory 21 to the drawing device portion 62 in accordance with the order of the addresses of those commands in the main memory 21. Therefore, to change the order of the execution of the draw commands, the positions of the draw commands in the main memory 21 must be changed.

Although the above-described embodiment has addressed a translation of a so-called 3D object, the present invention is not limited to 3D objects. The present invention may be applied to a translation of a simple polygon and a translation of an image such as a background image. An example of such a translation of a background image is as follows.

Figure 4:
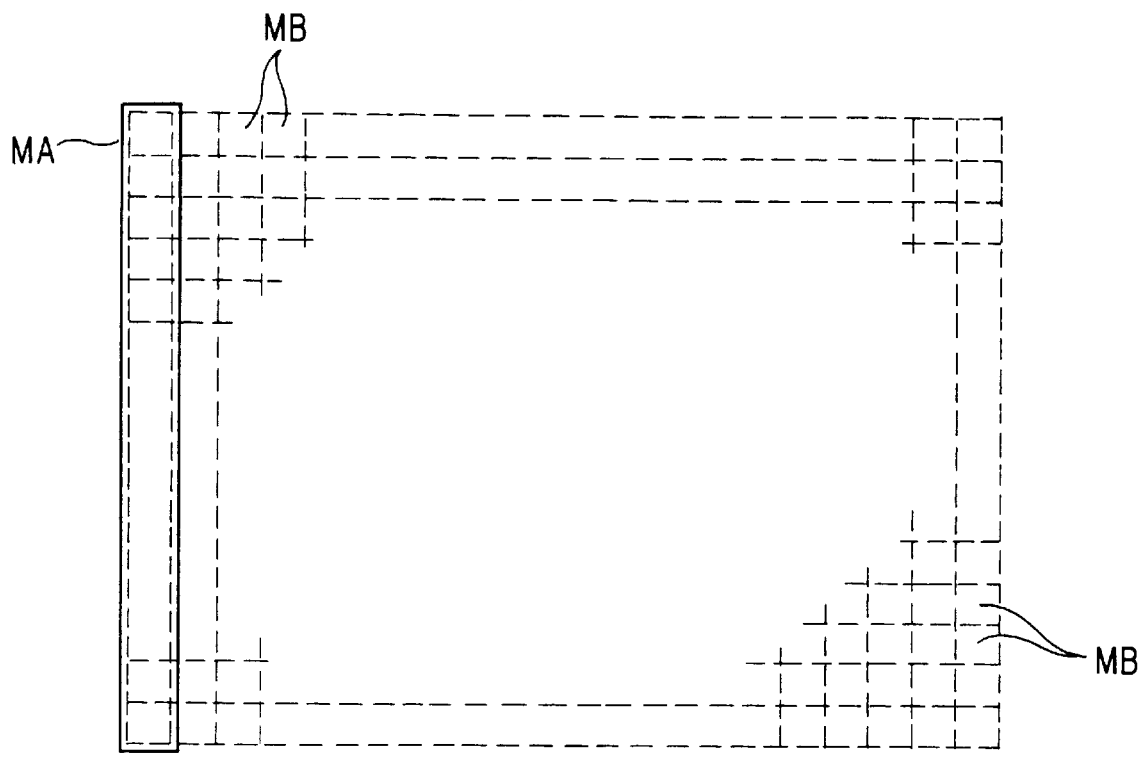
FIG. 4 illustrates an example of a method of dividing one frame of image during a translation of a background image according to the present invention.

For example, assume that one frame of a background image is formed by 320 (rows)×240 (columns) pixels; such a frame of an image is divided into 300 macro-blocks ME as shown in FIG. 4 each formed by 16 (rows)×16 (columns) pixels; and the background image is drawn on a macro-block basis.

Figure 5:
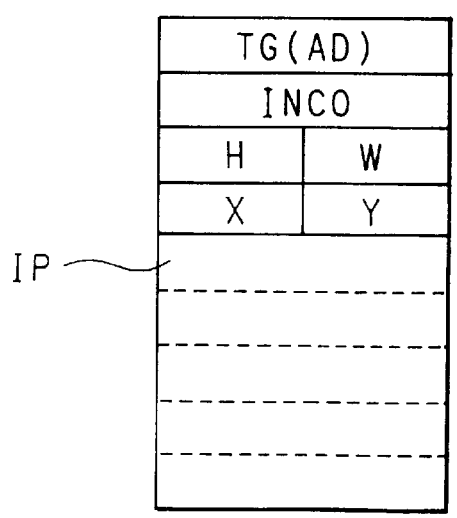
FIG. 5 illustrates an example of a draw command for a background image in the case of a translation of a background image according to the present invention.

As shown in FIG. 5, a draw command for this background image includes a header portion containing data AD indicating the address in the main memory 21 of the next draw command to be executed, an indication code INCO indicating that the subsequent data are draw commands for the background image, data H and W indicating the height and width of a macro-block area MA in which the background image is to be drawn, data X and Y indicating the coordinates of the upper left vertex of the macro-block area MA, and image data IP which follows the header portion.

While the width of the macro-block area MA corresponds to the width of one macro-block MB, the height of the macro-block area MA corresponds to the height of one macro-block or a plurality of macro-blocks which are consecutive in the vertical direction. The image data IP has been decompressed by the image decompression portion 53.

Such a background image may be treated similarly to a polygon, so it can be translated on the display screen using the above-described method.

The coordinate conversion portion 13 may be connected to the system bus 1 instead of being pipeline-connected to the CPU as in the illustrated embodiment.

Application programs and data may be recorded using semiconductor memories such as magnetic discs and memory cards instead of CD-ROMs.

Various modifications to the present invention will become apparent to those skilled in the art from the foregoing description and accompanying drawings. Accordingly, the present invention is to be limited solely by the scope of the following claims.

What is claimed is:

1. A method for generating images, comprising the steps of:

generating a plurality of strings of draw commands for drawing an image frame-by-frame in a frame buffer by use of a drawing device portion, each draw command having coordinates of said image;

inserting an offset draw command indicating first and second offset values in first and second different directions in the image for said coordinates of the image before each string of said draw commands for offsetting said image, an address of a first draw command in each string of draw commands being provided at a header portion of each respective offset draw command, and also each said header portion having an indication code indicating that subsequent data are offset draw commands;

in a header portion of each string of draw commands providing an address of a first draw command in a subsequent string of draw commands unless another offset draw command follows that string of draw commands in which case an address of the next offset draw command is provided, and also providing in said header of each string of draw commands an indication code indicating that subsequent data are polygon draw commands, said addresses and indication codes in said header portions of said offset draw commands and draw command strings allowing the main memory which stores a plurality of said draw command strings and associated offset draw commands to be sequentially accessed according to said respective addresses at said respective header portions to obtain the offset draw commands in associated draw command strings in a linked form in an order of execution and so that it is not necessary to place the offset draw commands and respective draw command string in consecutive memory areas in the main memory in order of execution;

outputting from said memory said offset values in associated draw command strings to said drawing device portion, and at said drawing device portion adding said respective offset value to the coordinates included in each respective draw command string in said drawing device portion; and executing said draw commands corresponding to the coordinates to which said offset values were added to generate a translated image frame in said frame buffer.

2. The method according to claim 1 including the step of providing a FIFO buffer between the main memory and the drawing device portion.

3. An image generation apparatus, comprising:

a CPU for generating a plurality of draw command strings and also for generating respective offset draw commands for draw command strings, each offset draw command indicating first and second offset values in first and second different directions in an image, said offset draw commands having a header portion with an address of a first draw command of a respective following draw command string and also having an indication code indicating that subsequent data are offset draw commands, and wherein each draw command string has a header portion with an address of a first draw command of a following draw command string or if another offset draw command follows the draw command string then an address of the next offset draw command, and said header portion of said draw command strings also having an indication code indicating that subsequent data are polygon draw commands;

a main memory for storing the draw command strings and offset draw commands from said CPU;

a drawing device portion connected to the main memory for receiving the offset draw commands and draw command strings, said drawing device portion drawing an image for deposit in a frame buffer connected to an output of the drawing device portion;

said drawing device portion having an offset register for receiving said first and second offset values and for adding them to each draw command in the respective draw command string; and said CPU controlling said main memory by use of said address of a header portion of each offset draw command and address of a header portion of each draw command string along with the indication codes in the header portions of the offset draw commands and draw command strings to permit the main memory to be sequentially accessed according to the address data to obtain the draw command strings and corresponding offset draw commands in a linked form in order of execution, and Wherein each said address in said header portions associated with each offset draw command and draw command string make it unnecessary that the offset draw commands and draw command strings be placed in consecutive memory areas in the main memory in order of execution.

4. A system according to claim 3 wherein a FIFO buffer is connected between the main memory and the drawing device portion.

* * * * *